United States Patent
De Anda et al.

(10) Patent No.: US 10,696,755 B2
(45) Date of Patent: Jun. 30, 2020

(54) METHODS TO CONTROL SWELL INDEX IN HIGH IMPACT POLYSTYRENE

(71) Applicant: Fina Technology, Inc., Houston, TX (US)

(72) Inventors: Carlos De Anda, Pearland, TX (US); Giovanni Trimino, Houston, TX (US); Brad Stiles, Houston, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 144 days.

(21) Appl. No.: 15/835,203

(22) Filed: Dec. 7, 2017

(65) Prior Publication Data

US 2018/0162961 A1    Jun. 14, 2018

Related U.S. Application Data

(60) Provisional application No. 62/431,706, filed on Dec. 8, 2016.

(51) Int. Cl.

| | | |
|---|---|---|
| *C08F 2/01* | (2006.01) | |
| *C08F 2/38* | (2006.01) | |
| *C08F 279/02* | (2006.01) | |
| *C08J 3/24* | (2006.01) | |
| *C08K 5/13* | (2006.01) | |
| *C08K 5/372* | (2006.01) | |
| *C08K 5/375* | (2006.01) | |
| *C08F 6/00* | (2006.01) | |

(52) U.S. Cl.
CPC ............... *C08F 2/01* (2013.01); *C08F 2/38* (2013.01); *C08F 6/001* (2013.01); *C08F 279/02* (2013.01); *C08J 3/24* (2013.01); *C08K 5/372* (2013.01); *C08K 5/13* (2013.01); *C08K 5/375* (2013.01)

(58) Field of Classification Search
CPC . C08F 2/01; C08F 2/38; C08F 279/02; C08K 3/375; C08K 5/13; C08K 5/372; C08J 3/24
See application file for complete search history.

(56) References Cited

U.S. PATENT DOCUMENTS

| | | |
|---|---|---|
| 4,777,210 A | 10/1988 | Sosa et al. |
| 9,193,839 B2 | 11/2015 | Wang et al. |
| 2008/0021157 A1* | 1/2008 | Sosa .................... C08F 279/02 525/70 |
| 2010/0184920 A1 | 7/2010 | Knoeppel |

FOREIGN PATENT DOCUMENTS

| | | |
|---|---|---|
| WO | 2015138692 A1 | 9/2015 |
| WO | WO-2015138692 A1 * | 9/2015 |

OTHER PUBLICATIONS

Foreign communication from a counterpart application—International Search Report and Written Opinion, PCT/US2017/065167, dated Mar. 13, 2018, 15 pages.

* cited by examiner

*Primary Examiner* — Robert D Harlan
(74) *Attorney, Agent, or Firm* — Albert Shung

(57) ABSTRACT

A method including operating a high impact polystyrene (HIPS) reaction system having a devolatilizer downstream of a polymerization reactor, and from which a HIPS product is obtained, and injecting an antioxidant into the HIPS reaction system prior to the devolatilizer, with the antioxidant being one or more aromatic antioxidants. A HIPS product produced by operating a HIPS reaction system to produce a HIPS product, with the HIPS reaction system including a devolatilizer downstream of a polymerization reactor, and including injecting an antioxidant into the HIPS reaction system prior to the devolatilizer, with the antioxidant being comprising one or more aromatic antioxidants. The antioxidant may comprise at least one thiol group, at least one cresol group, or both. A system for producing the HIPS product is also provided.

21 Claims, 3 Drawing Sheets

METHODS TO CONTROL SWELL INDEX IN HIGH IMPACT POLYSTYRENE

CROSS-REFERENCE TO RELATED APPLICATIONS

The present application claims priority under 35 U.S.C. § 119(e) to U.S. Provisional Patent Application No. 62/431,706 filed on Dec. 8, 2016 by Fina Technology, Inc., and entitled "Methods To Control Swell Index In High Impact Polystyrene," the disclosure of which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present disclosure relates to the production of high impact polystyrene and other elastomer-reinforced polymers of vinyl aromatic compounds (collectively referred to herein as, 'HIPS'). More particularly, the present disclosure provides systems and methods for controlling the swell index in HIPS. Still more particularly, the present disclosure provides systems and methods for producing HIPS having a desirable extent of cross-linking.

BACKGROUND

Elastomer-reinforced polymers of vinyl aromatic compounds, such as styrene, alpha-methylstyrene and ring-substituted styrene, have found widespread commercial use. For example, elastomer-reinforced styrene polymers having discrete particles of cross-linked elastomer dispersed throughout the styrene polymer matrix can be useful for a range of applications, including, without limitation, food packaging, office supplies, point-of-purchase signs and displays, housewares and consumer goods, building insulation, and cosmetics packaging. The incorporation of an elastomer into the styrene matrix results in improvements in a range of physical and mechanical properties (e.g., impact strength) and collectively these polymers are termed high-impact polystyrenes (HIPS).

The utility of a particular HIPS depends on the polymer having some combination of mechanical, thermal, and/or physical properties that render the material suitable for a particular application. These properties are related in part to the extent of incorporation of the elastomeric material into the polymer matrix. Many factors during polymerization can affect the properties of polymer. Once such factor is the degree of crosslinking in the rubber phase, which may result in decreased impact resistance and environmental stress cracking resistance (ESCR), which may be reflected by a lower swell index.

Some crosslinking may be desired for low to medium viscosity rubber to stabilize the rubber particle morphology through the devolatilization process. However, excess cross-linking may alter the elasticity of the elastomer phase and be detrimental to the final properties of HIPS, such as impact strength and environmental stress cracking resistance.

Accordingly, there exists an ongoing need for systems and processes for providing HIPS having desired impact strength and ESCR. Desirably, such systems and processes enable production of HIPS having a suitable degree of crosslinking in the rubber phase, while maintaining a desirable color, as will be described in more detail hereinbelow.

SUMMARY

Herein disclosed is a method comprising operating a high impact polystyrene (HIPS) reaction system, wherein the HIPS reaction system comprises a devolatilizer downstream of a polymerization reactor, and from which a HIPS product is obtained; and injecting an antioxidant into the HIPS reaction system prior to the devolatilizer, wherein the antioxidant comprises one or more aromatic antioxidants. In embodiments, the antioxidant comprises at least one thiol group, at least one cresol group, or a combination thereof. In embodiments, the cresol group is selected from o-cresol groups. In embodiments, the antioxidant comprises at least two thiol groups. In embodiments, the antioxidant comprises at least one alkyl-thiomethyl group. In embodiments, the alkyl-thiomethyl group comprises octylthiomethyl groups, dodecylthiomethyl groups, or combinations thereof. In embodiments, the antioxidant comprises at least two alkyl-thiomethyl groups. In embodiments, the antioxidant comprises 2-methyl-4,6-bis(octylthiomethyl)phenol, 2-methyl-4,6-bis (dodecylthiomethyl) phenol, or a combination thereof. In embodiments, the antioxidant has a solubility in ethylbenzene that is greater than or equal to about 30% (w/w), 40% (w/w), or 50% (w/w). In embodiments, the antioxidant has a low volatility, as evidenced by a vapor pressure at 25° C. that is less than or equal to about $4E^{-5}$ Pa, $3E^{-5}$ Pa, or $2E^{-5}$ Pa.

In embodiments, injecting the antioxidant into the HIPS reaction system prior to the devolatilizer further comprises injecting the antioxidant into the polymerization reactor, injecting the antioxidant into a polymer melt downstream of the polymerization reactor, or both. In embodiments, the method comprises injecting the antioxidant into the polymerization reactor, and injecting the antioxidant into the polymerization reactor further comprises injecting the antioxidant into a feed to the polymerization reactor. In embodiments, the method comprises injecting the antioxidant into a polymer melt downstream of the polymerization reactor, and injecting the antioxidant into a polymer melt downstream of the polymerization reactor further comprises injecting the antioxidant into a polymer melt feed just prior to introduction of the polymer melt feed into the devolatilizer. In embodiments, the antioxidant is injected 30, 25, 20, 15, or 10 minutes prior to targeted conversion. In embodiments, the targeted conversion is greater than or equal to about 40, 50, 60, or 70% (conversion defined here as total mass of polymer divided by total mass of styrene monomer fed). In embodiments, the method further comprises devolatilizing for a time period in the range of from about 30 to about 60, alternatively from about 40 to about 60, or alternatively from about 50 to about 60 minutes at a temperature in the range of about 200° C. to 225° C., alternatively from about 215° C. to about 225° C. or alternatively from about 220° C. to about 225° C.

In embodiments, the concentration of the antioxidant prior to the devolatilizer is in the range of from about 1 ppm to 1% (by weight). In embodiments, the antioxidant concentration prior to the devolatilizer is in the range of from about 50 ppm to about 1000 ppm, from about 100 ppm to about 1000 ppm, or from about 300 ppm to about 1000 ppm by weight. In embodiments, the HIPS product has a swell index, after devolatilization, that is at least from about 1% to about 50%, from 1% to about 40%, from 1% to about 30%, from 5% to about 50%, or from 10% to about 50% greater than the swell index of a HIPS product produced in substantially the same manner absent the antioxidant. In embodiments, the swell index of the HIPS product is at least about 1 to 10, 2 to 10, 3 to 10, 4 to 10, or 5 to 10 over that of a HIPS product produced in substantially the same manner absent the antioxidant. In embodiments, the HIPS product has at least as low a discoloration, after devolatilization, as a HIPS product produced in substantially the same manner absent the antioxidant. In embodiments, the at least as low a discoloration is indicated by a yellow index ($Y_{id}$) value that is less than or equal to that of the HIPS product produced in substantially the same manner absent the antioxidant. Devolatilization may comprise devolatilizing for a time period in the range of from about 30 to about 60, alternatively from about 40 to about 60, or alternatively from about 50 to about 60 minutes at a temperature in the range of about 200° C. to 225° C., alternatively from about 215° C. to about 225° C. or alternatively from about 220° C. to about 225° C.

Also disclosed herein is a high impact polystyrene (HIPS) product produced by: operating a HIPS reaction system to produce the HIPS product, wherein the HIPS reaction system comprises a devolatilizer downstream of a polymerization reactor, wherein operating the HIPS reaction system to produce the HIPS product comprises injecting an antioxidant into the HIPS reaction system prior to the devolatilizer, and wherein the antioxidant comprises one or more aromatic antioxidants. In embodiments, the antioxidant comprises at least one thiol group, at least one cresol group, or a combination thereof. In embodiments, the cresol group is selected from o-cresol groups. In embodiments, the antioxidant comprises at least two thiol groups. In embodiments, the antioxidant comprises at least one alkyl-thiomethyl group. In embodiments, the alkyl-thiomethyl group comprises octylthiomethyl groups, dodecylthiomethyl groups, or combinations thereof. In embodiments, the antioxidant comprises at least two alkyl-thiomethyl groups. In embodiments, the antioxidant comprises 2-methyl-4,6-bis(octylthiomethyl)phenol, 2-methyl-4,6-bis (dodecylthiomethyl) phenol, or a combination thereof. In embodiments, the antioxidant has a solubility in ethylbenzene that is greater than or equal to about 30% (w/w), 40% (w/w), or 50% (w/w). In embodiments, the antioxidant has a low volatility, as evidenced by a vapor pressure at 25° C. that is less than or equal to about $4E^{-5}$ Pa, $3E^{-5}$ Pa, or $2E^{-5}$ Pa.

In embodiments, injecting the antioxidant into the HIPS reaction system prior to the devolatilizer further comprises injecting the antioxidant into the polymerization reactor, injecting the antioxidant into a polymer melt downstream of the polymerization reactor, or both. In embodiments the antioxidant is injected into the polymerization reactor, and injecting the antioxidant into the polymerization reactor further comprises injecting the antioxidant into a feed to the polymerization reactor. In embodiments, the antioxidant is injected into a polymer melt downstream of the polymerization reactor, and injecting the antioxidant into a polymer melt downstream of the polymerization reactor further comprises injecting the antioxidant into a polymer melt feed just prior to introduction of the polymer melt feed into the devolatilizer. In embodiments, the antioxidant is injected 30, 25, 20, 15, or 10 minutes prior to targeted conversion. In embodiments, the targeted conversion is greater than or equal to about 40, 50, 60, or 70% (conversion defined here as total mass of polymer divided by total mass of styrene monomer fed). In embodiments, producing the HIPS product further comprises devolatilizing for a time period in the range of from about 30 to about 60, alternatively from about 40 to about 60, or alternatively from about 50 to about 60 minutes at a temperature in the range of about 200° C. to 225° C., alternatively from about 215° C. to about 225° C. or alternatively from about 220° C. to about 225° C.

In embodiments, the concentration of the antioxidant prior to the devolatilizer is in the range of from about 1 ppm to 1% (by weight). In embodiments, the antioxidant concentration prior to the devolatilizer is in the range of from about 50 ppm to about 1000 ppm, from about 100 ppm to about 1000 ppm, or from about 300 ppm to about 1000 ppm by weight. In embodiments, the HIPS product has, after devolatilization, a swell index that is at least at least from about 1% to about 50%, from 1% to about 40%, from 1% to about 30%, from 5% to about 50%, or from 10% to about 50% greater than the swell index of a HIPS product produced in substantially the same manner absent the antioxidant. In embodiments, the HIPS product has a swell index that is at least about 1 to 10, 2 to 10, 3 to 10, 4 to 10, or 5 to 10 over that of a HIPS product produced in substantially the same manner absent the antioxidant. In embodiments, the HIPS product has at least as low a discoloration, after devolatilization, as a HIPS product produced in substantially the same manner absent the antioxidant. In embodiments, the at least as low a discoloration is indicated by a yellow index ($Y_{id}$) value that that is less than or equal to that of the HIPS product produced in substantially the same manner absent the antioxidant. Devolatilization may comprise devolatilizing for a time period in the range of from about 30 to about 60, alternatively from about 40 to about 60, or alternatively from about 50 to about 60 minutes at a temperature in the range of about 200° C. to 225° C., alternatively from about 215° C. to about 225° C. or alternatively from about 220° C. to about 225° C.

Also disclosed herein is a method comprising: operating a high impact polystyrene (HIPS) reaction system, wherein the HIPS reaction system comprises a devolatilizer downstream of a polymerization reactor; and injecting an antioxidant into the HIPS reaction system prior to the devolatilizer, wherein the antioxidant is present in a polymer melt and/or a polymerization feed prior to the devolatilizer at a concentration in the range of from about 1 ppm to about 10000 ppm, from about 50 ppm to about 10000 ppm, from about 50 ppm to about 1000 ppm, from about 100 ppm to about 1000 ppm, or from about 300 ppm to about 1000 ppm by weight. In embodiments, the antioxidant comprises at least one thiol group, at least one cresol group, or a combination thereof. In embodiments, the cresol group is selected from o-cresol groups. In embodiments, the antioxidant comprises at least two thiol groups. In embodiments, the antioxidant comprises at least one alkyl-thiomethyl group. In embodiments, the alkyl-thiomethyl group comprises octylthiomethyl groups, dodecylthiomethyl groups, or combinations thereof. In embodiments, the antioxidant comprises at least two alkyl-thiomethyl groups. In embodiments, the antioxidant comprises 2-methyl-4,6-bis(octylthiomethyl)phenol, 2-methyl-4,6-bis (dodecylthiomethyl) phenol, or a combination thereof. In embodiments, the antioxidant has a solubility in ethylbenzene that is greater than or equal to about 30% (w/w), 40% (w/w), or 50% (w/w). In embodiments, the antioxidant has a low volatility, as evidenced by a vapor pressure at 25° C. that is less than or equal to about $4E^{-5}$ Pa, $3E^{-5}$ Pa, or $2E^{-5}$ Pa.

In embodiments, injecting the antioxidant into the HIPS reaction system prior to the devolatilizer further comprises injecting the antioxidant into the polymerization reactor, injecting the antioxidant into a polymer melt downstream of the polymerization reactor, or both. In embodiments, the method comprises injecting the antioxidant into the polymerization reactor, and injecting the antioxidant into the polymerization reactor further comprises injecting the antioxidant into a feed to the polymerization reactor. In embodiments, the method comprises injecting the antioxidant into a polymer melt downstream of the polymerization reactor, and injecting the antioxidant into a polymer melt downstream of the polymerization reactor further comprises injecting the antioxidant into a polymer melt feed just prior to introduction of the polymer melt feed into the devolatilizer. In embodiments, the antioxidant is injected 30, 25, 20, 15, or 10 minutes prior to targeted conversion. In embodiments, the targeted conversion is greater than or equal to about 40, 50, 60, or 70% (conversion defined here as total mass of polymer divided by total mass of styrene monomer fed).

In embodiments, the method further comprises devolatilizing for a time period in the range of from about 30 to about 60, alternatively from about 40 to about 60, or alternatively from about 50 to about 60 minutes at a temperature in the range of about 200° C. to 225° C., alternatively from about 215° C. to about 225° C. or alternatively from about 220° C. to about 225° C. In embodiments, the HIPS product has a swell index, after devolatilization, that is at least from about 1% to about 50%, from 1% to about 40%, from 1% to about 30%, from 5% to about 50%, or from 10% to about 50% greater than the swell index of a HIPS product produced in substantially the same manner absent the antioxidant. In embodiments, the swell index of the HIPS product is at least from about 1% to about 50%, from 1% to about 40%, from 1% to about 30%, from 5% to about 50%, or from 10% to about 50% greater than the swell index of a HIPS product produced in substantially the same manner absent the antioxidant. In embodiments, the HIPS product has at least as low a discoloration, after devolatilization, as a HIPS product produced in substantially the same manner absent the antioxidant. The at least as low discoloration may be indicated by a yellow index ($Y_{id}$) value that is less than or equal to that of the HIPS product produced in substantially the same manner absent the antioxidant. Devolatilization may comprise devolatilizing for a time period in the range of from about 30 to about 60, alternatively from about 40 to about 60, or alternatively from about 50 to about 60 minutes at a temperature in the range of about 200° C. to 225° C., alternatively from about 215° C. to about 225° C. or alternatively from about 220° C. to about 225° C.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems, methods, and/or products may be implemented using any number of techniques, whether currently known or in existence. The disclosure should in no way be limited to the illustrative implementations, drawings, and techniques illustrated hereinbelow, including the exemplary designs and implementations illustrated and described herein, but may be modified within the scope of the appended claims along with their full scope of equivalents.

As noted hereinabove, excess rubber crosslinking, as a result of, for example, longer residence time and/or higher temperature in the devolatilizer, can be detrimental to the physical properties of the resultant HIPS. Without wishing to be bound by theory, it is believed that a crosslinking reaction may occur in the elastomeric phase when the polymer melt runs through the devolatilization section. The exposure to the relatively high temperature in the devolatilization section (including the devolatilization preheater) may initiate the crosslinking of the elastomeric material, such as, without limitation, polybutadiene chains, through a free radical mechanism. It has been unexpectedly discovered that a chemical retarder (also referred to herein as an 'antioxidant' or a 'scorch retarder') can be added into the polymerization to reduce/allow control of the free radical rubber crosslinking and thus help preserve elastic properties of the rubber phase, which may result in improved physical properties of the HIPS product. The chemical retarder can be added at any stage of polymerization, prior to the devolatilization. In embodiments, the chemical retarder is added at a later stage in the polymerization, such as, for example, 30, 25, 20, 15, or 10 minutes prior to targeted conversion. In embodiments, the chemical retarder is added to a polymerization feed. Targeted conversion may be greater than or equal to about 40, 50, 60, 70, 80, or 90% conversion, wherein conversion is herein defined as total mass of polymer divided by total mass of styrene monomer fed.

This disclosure provides a high impact polystyrene (HIPS) reaction system and a method for producing HIPS, wherein the HIPS reaction system and method utilize or operate a devolatilizer downstream of a polymerization reactor and injection of an antioxidant into the HIPS reaction system prior to the devolatilizer. Also disclosed herein is a HIPS product produced via the herein-disclosed system and/or method.

Figure 1:
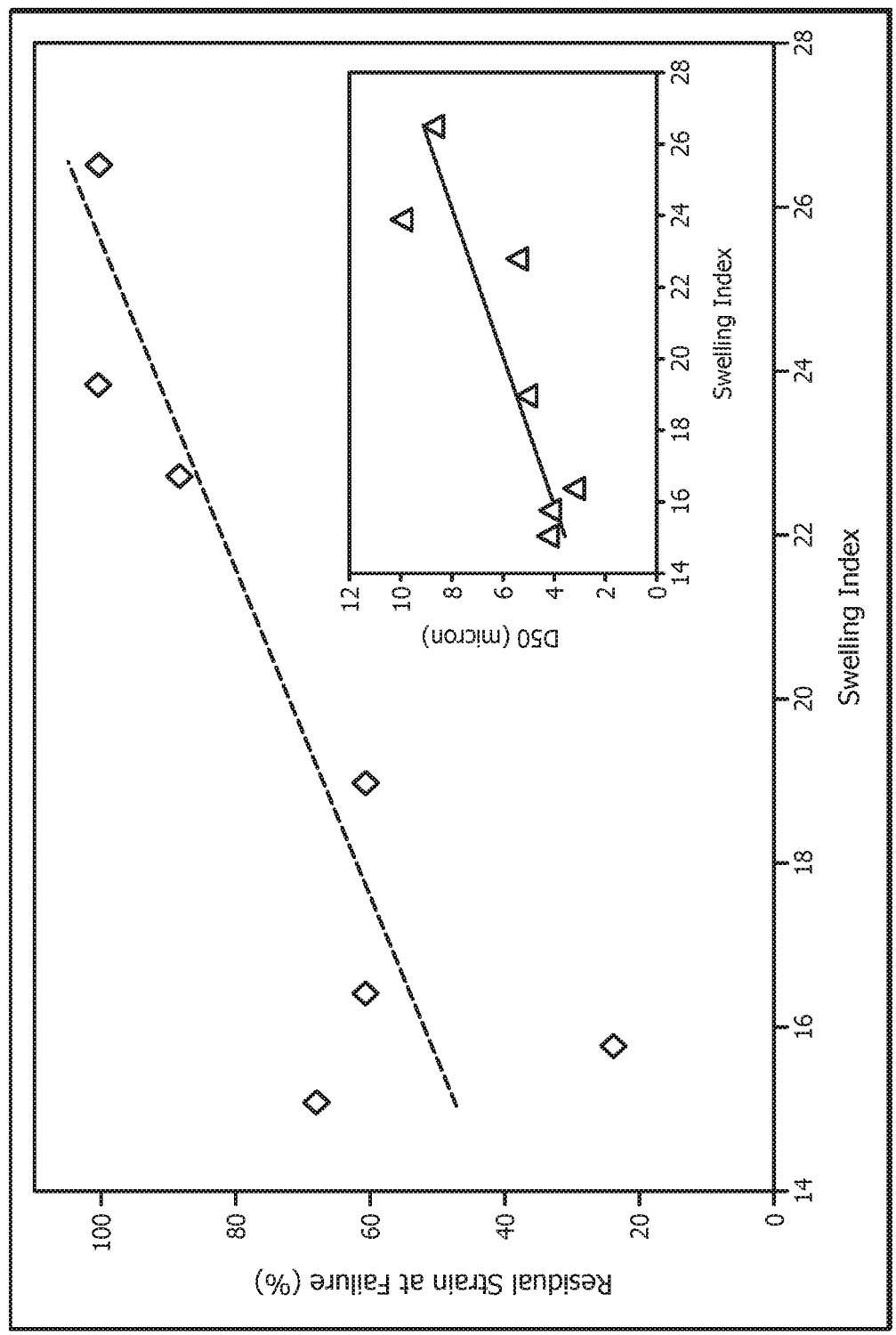
FIG. 1 is a graph depicting residual strain at failure (%) versus swell index as found in Journal of Applied Polymer Science 121, 2011, 1697.

An example of a relationship between rubber crosslinking density and ESCR is illustrated in FIG. 1, in which the crosslinking density is indirectly indicated by swell index and ESCR by the residual strain at failure. The system and method disclosed herein provide for the production of a HIPS product having a reduced crosslinking density, as indicated by the swell index. The HIPS product may also have a reduced ESCR. In embodiments, the method comprises operating a high impact polystyrene (HIPS) reaction system that comprises a devolatilizer downstream of a polymerization reactor, injecting an antioxidant into the HIPS reaction system prior to the devolatilizer (and/or injecting the antioxidant into the devolatilizer at the beginning of devolatilization) and extracting a HIPS product therefrom. In embodiments, the antioxidant is not provided as a component of an elastomeric phase provided in a polymerization feed (i.e., is not a component of a rubber utilized in the polymerization feed), but is an additional or 'injected' amount.

In embodiments of the present disclosure, the amount of crosslinking (as measured by the swell index of the HIPS) is controlled by addition of the antioxidant or retarding chemical agent to a polymer melt and/or a polymerization feed prior to a devolatilization section to slow the crosslinking reaction. 'Polymer melt' as utilized herein refers to any polymerization product downstream of at least one polymerization reactor and having a temperature equal to or greater than the melting point of the polymerization product. In embodiments, the crosslinking retarder does not act as a chain transfer agent to a significant degree (i.e., doesn't alter/increase the molecular weight (i.e., the weight average molecular weight, Mw; the number average molecular weight, Mn; and/or the Z-average molecular weight, Mz) of the HIPS product by more than 1, 3, 5, or 10%). In embodiments, the antioxidant serves as a free radical scavenger and/or as a coagent.

In embodiments, the antioxidant is FDA approved, cost efficient, soluble in EB (>50% w/w), has a low volatility (e.g., has a desirably low vapor pressure and/or high boiling point), and produces no to minimal discoloration. In embodiments, the antioxidant comprises one or more aromatic antioxidants. In embodiments, the antioxidant is an aromatic thio alkyl o-cresol type antioxidant. In embodiments, the antioxidant comprises one or more thiol group, one or more cresol group, or both one or more thiol group and one or more cresol group. In embodiments, the cresol group is selected from o-cresol groups. In embodiments, the antioxidant can comprises at least two thiol groups. The antioxidant can comprise at least one alkyl-thiomethyl group. The at least one alkyl-thiomethyl group can be, for example, an octylthiomethyl group, a dodecylthiomethyl group, or another alkyl-thiomethyl group. In embodiments, the antioxidant comprises at least two alkyl-thiomethyl groups. In embodiments, the antioxidant comprises 2-methyl-4,6-bis(octylthiomethyl)phenol, 2-methyl-4,6-bis(dodecylthiomethyl) phenol, or a combination thereof. For example, in embodiments, the antioxidant comprises IRGANOX® 1520 (available from BASF USA in Florham Park), and/or BNX® 1037 (available from Mayzo, Inc., in Suwanee, Ga.).

As noted hereinabove, in embodiments, the antioxidant is soluble in ethylbenzene and/or has a low volatility. In embodiments, the antioxidant has a solubility in ethylbenzene that is greater than or equal to about 30% (w/w), 40% (w/w), or 50% (w/w). In embodiments, the antioxidant has a low volatility, as evidenced by a vapor pressure at 25° C. that is less than or equal to about $4E^{-5}$ Pa, $3E^{-5}$ Pa, or $2E^{-5}$ Pa. In embodiments, the antioxidant has a low volatility, as evidenced by a boiling point at 25° C. that is greater than or equal to about 180° C., 200° C., or 220° C.

As noted hereinabove, the antioxidant may be injected into the HIPS reaction system prior to the devolatilizer. For example, in embodiments, the antioxidant injected into the or a polymerization reactor (e.g., via a polymerization feed thereof, or directly thereto) of the HIPS production system, into a polymer melt downstream of the or a polymerization reactor of the HIPS production system, or both.

Figure 2:
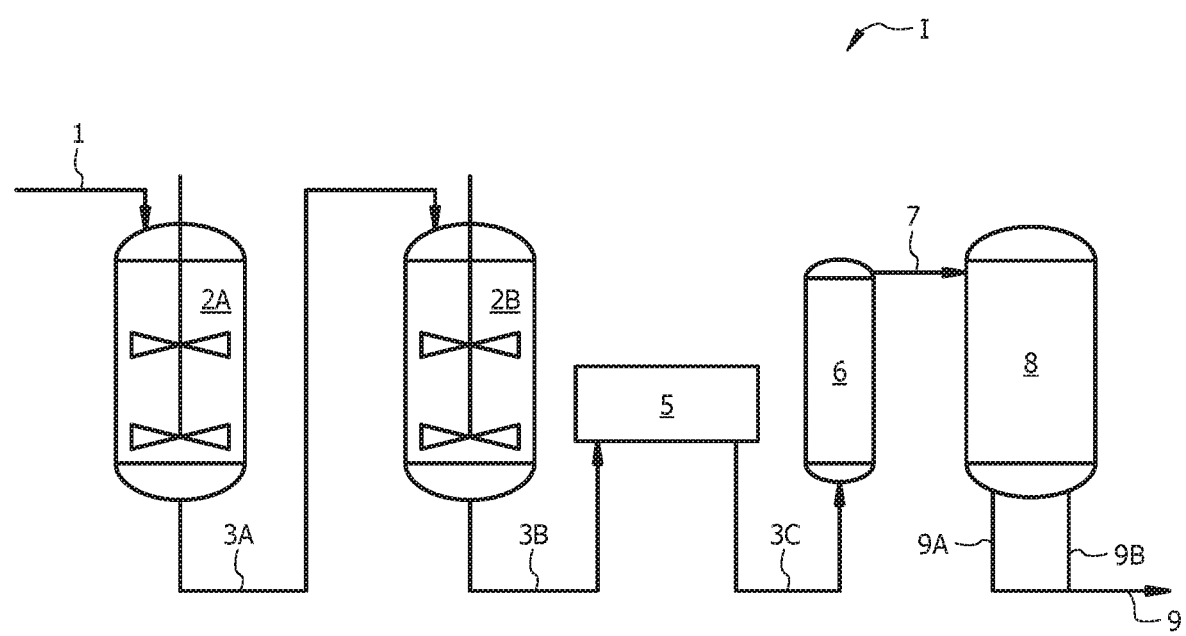
FIG. 2 is a schematic of a HIPS production system, according to embodiments of this disclosure.

FIG. 2 will be utilized to indicate suitable injection points for the antioxidant. However, it is to be understood that other HIPS production systems as known to those of skill in the art may be utilized to produce HIPS according to embodiments of this disclosure. That is, any suitable HIPS production system known in the art may be modified to accommodate the injection of antioxidant as described herein, and/or utilized to produce a HIPS product having an improved swell index and/or ESCR according to this disclosure. A suitable HIPS production system comprises at least one polymerization reactor and at least one devolatilizer. The HIPS production system can comprise one or more polymerization reactors selected from continuous stirred tank reactors (CSTRs) and plug flow reactors (PFRs). A suitable HIPS production system can comprise one or more CSTR or plug flow reactor (PFR) polymerization reactor, and at least one devolatilizer. The system may further comprise one or more heaters.

In embodiments, the polymerization reaction to form HIPS is carried out in a solution or mass polymerization process. Mass polymerization, also known as bulk polymerization, refers to the polymerization of a monomer in the absence of any medium other than the monomer and a catalyst or polymerization initiator. Solution polymerization refers to a polymerization process in which the monomers and polymerization initiators are dissolved in a non-monomeric liquid solvent at the beginning of the polymerization reaction. The liquid is usually also a solvent for the resulting polymer or copolymer.

The polymerization process can be either batch or continuous. In embodiments, the polymerization reaction is carried out using a continuous production process in a polymerization apparatus comprising a single reactor or a plurality of polymerization reactors. For example, the polymeric composition can be prepared using an upflow reactor. Reactors and conditions for the production of a polymeric composition are known to those of skill in the art. For example, reactors and conditions are provided, by way of non-limiting example, in U.S. Pat. No. 4,777,210, the disclosure of which is hereby incorporated herein by reference in its entirety for all purposes not contrary to this disclosure. In embodiments, the polymerization reaction is carried out in a plurality of reactors, with each reactor having an optimum temperature range. For example, the polymerization reaction may be carried out in a reactor system employing a first polymerization reactor and a second polymerization reactor that are either continuously stirred tank reactors (CSTR) or plug-flow reactors. In embodiments, a polymerization system for the production of HIPS as disclosed herein comprises a plurality of polymerization reactors, and may comprise a first polymerization reactor (e.g., a CSTR), also known as the prepolymerization reactor, and a second polymerization reactor (e.g., CSTR or plug flow).

The product effluent from the first reactor may be referred to as the prepolymer. When the prepolymer reaches the desired conversion, it may be passed through a heating device into a second reactor for further polymerization. The polymerized product effluent from the second reactor may be further processed, as is described in detail in the literature. Upon completion of the polymerization reaction, HIPS can be extracted from the second reactor and devolatilized.

FIG. 2 is a schematic of a HIPS production system, which will be utilized to describe suitable injection points for the antioxidant according to this disclosure. In the embodiment of FIG. 2, HIPS production system I comprises first CSTR 2A, second CSTR 2B, PFR 5, a heater 6, and a devolatilizer 8. A polymerization feed (comprising, for example, styrene monomer, rubber, and other components as known to those of skill in the art) is introduced into polymerization system I via polymerization feed line 1. Polymerization product of first CSTR 2A is fed into second CSTR 2B via first CSTR outlet line 3A, and polymerization product of second CSTR 2B is introduced into PFR 5 via second CSTR outlet line 3B.

The polymerization product of PFR 5 can be introduced into heater 6 via PFR outlet line 3C. Heated polymer melt may be introduced into devolatilizer 8 via heater outlet line 7. Polymer product may be removed from devolatilizer 8 via one or more outlet lines 9A/9B, and sent for further processing, sale, packaging, etc., via line 9.

As noted hereinabove, in embodiments, the antioxidant is injected into the polymerization reactor. For example, the antioxidant may be injected, in embodiments, into the polymerization reactor by introduction into a polymerization feed thereto. For example, in the embodiment of FIG. 2, the antioxidant may, in embodiments, be injected into polymerization feed line 1. In embodiments, the antioxidant is injected into a polymer melt downstream of a polymerization reactor. For example, in embodiments, antioxidant is injected into the polymer product of a polymerization reactor upstream of the devolatilizer. For example, in the embodiment of FIG. 2, the antioxidant may be injected into the polymerization product in first CSTR outlet line 3A, second CSTR outlet line 3B, PFR outlet line 3C, or a combination thereof. In embodiments, injecting the antioxidant into a polymer melt downstream of a polymerization reactor comprises injecting the antioxidant into a polymer melt feed just prior to introduction of the polymer melt feed into the devolatilizer. For example, in embodiments, the HIPS production system comprises a plurality of polymerization reactors, and the antioxidant is injected into a polymer melt downstream of the last of the plurality of polymerization reactors. In embodiments, the antioxidant is injected 30, 25, 20, 15, or 10 minutes prior to targeted conversion. The targeted conversion may be greater than or equal to about 40, 50, 60, or 70% (conversion defined here as total mass of polymer divided by total mass of styrene monomer fed). The method may further comprise devolatilizing for a time period in the range of from about 30 to about 60, alternatively from about 40 to about 60, or alternatively from about 50 to about 60 minutes at a temperature in the range of about 200° C. to 225° C., alternatively from about 215° C. to about 225° C. or alternatively from about 220° C. to about 225° C.

The concentration of the antioxidant (for example in a polymerization feed and/or in a polymer melt at a later stage of the polymerization) prior to the devolatilizer can be in the range of from about 1 ppm to 1% (by weight). In embodiments, the antioxidant concentration upon injection prior to the devolatilizer is in the range of from about 50 ppm to about 1000 ppm, from about 100 ppm to about 1000 ppm, or from about 300 ppm to about 1000 ppm by weight.

Also disclosed herein is a HIPS product produced via the disclosed system and method. The HIPS product may have a swell index, after devolatilization, that is at least from about 1% to about 50%, from 1% to about 40%, from 1% to about 30%, from 5% to about 50%, or from 10% to about 50% greater than the swell index of a HIPS product produced in substantially the same manner absent the antioxidant. In embodiments, the swell index of the HIPS product is at least about 1 to 10, 2 to 10, 3 to 10, 4 to 10, or 5 to 10 over that of a HIPS product produced in substantially the same manner absent the antioxidant. In embodiments, the HIPS product has at least as low a discoloration, after devolatilization, as a HIPS product produced in substantially the same manner absent the antioxidant. This yellowing/coloration process can be evaluated, in embodiments, by the yellowness index (Yid) and/or the yellow-blue color value (b) (as measured, for example, by a Hunter Lab calorimeter). The at least as low a discoloration may be indicated by a yellow index ($Y_{id}$) value that is less than or equal to that of the HIPS product produced in substantially the same manner absent the antioxidant. In embodiments, the HIPS product has an Izod impact, as determined in accordance with ASTM D-256, that is at least 5, 10, or 15% greater than that of a HIPS product produced in substantially the same manner absent the antioxidant. As noted hereinabove, devolatilization can comprise devolatilizing for a time period in the range of from about 30 to about 60, alternatively from about 40 to about 60, or alternatively from about 50 to about 60 minutes at a temperature in the range of about 200° C. to 225° C., alternatively from about 215° C. to about 225° C. or alternatively from about 220° C. to about 225° C.

HIPS refers to any elastomer-reinforced vinylaromatic polymers. The vinylaromatic monomers may include, but are not limited to, styrene, alpha-methylstyrene and ring-substituted styrene. HIPS may further include comonomers, including methylstyrene; halogenated styrenes; alkylated styrenes; acrylonitrile; esters of (meth)acrylic acid with alcohols having from 1 to 8 carbons; N-vinyl compounds such as vinyl-carbazole, maleic anhydride; compounds which contain two polymerizable double bonds such as divinylbenzene or butanediol diacrylate; or combinations thereof. The comonomer may be present in an amount effective to impart one or more user-desired properties to the composition. Such effective amounts may be determined by one of ordinary skill in the art with the aid of this disclosure. For example, the comonomer may be present in the styrenic polymer composition in an amount of from 1 wt. % to 99.9 wt. % by total weight of the reaction mixture, from 1 wt. % to 90 wt. %, or from 1 wt. % to 50 wt. %.

The elastomeric material is typically embedded in the polystyrene matrix. Examples of elastomeric materials include conjugated diene monomers, including, without limitation, 1,3-butadiene, 2-methyl-1,3-butadiene, 2-chloro-1,3 butadiene, 2-methyl-1,3-butadiene, or combinations thereof. In embodiments, the HIPS product comprises an aliphatic conjugated diene monomer as the elastomer. Without limitation, examples of suitable aliphatic conjugated diene monomers include C4 to C9 dienes, such as butadiene monomers. Blends or copolymers of the diene monomers may also be utilized. Likewise, mixtures or blends of one or more elastomers may be used. In embodiments, the elastomer comprises a homopolymer of a diene monomer; in embodiments, the elastomer comprises polybutadiene. The elastomer may be present in the HIPS in amounts effective to produce one or more user-desired properties. Such effective amounts may be determined by one of ordinary skill in the art with the aid of this disclosure. For example, the elastomer may be present in the HIPS product in an amount of from 1 wt. % to 20 wt. %, from 2 wt. % to 15 wt. %, or from 5 wt. % to 11 wt. %, based on the total weight of the HIPS.

In embodiments, a HIPS product of this disclosure has a melt flow rate of from 1 g/10 min. to 40 g/10 min., from 1.5 g/10 min. to 20 g/10 min., or from 2 g/10 min. to 15 g/10 min., as determined in accordance with ASTM D-1238; a falling dart impact of from 5 in-lb to 200 in-lb (from 0.6 to 22.6 N-m), from 50 in-lb to 180 in-lb (from 5.6 to 20.3 N-m), or from 100 in-lb to 150 in-lb (from 11.3 to 16.9 N-m), as determined in accordance with ASTM D-3029; an Izod impact of from 0.4 ft-lbs/in to 5 ft-lbs/in (from 0.4 to 267 J/m), from 1 ft-lbs/in to 4 ft-lbs/in (from 53 to 213 J/m), or from 2 ft-lbs/in to 3.5 ft-lbs/in (from 107 to 187 J/m), as determined in accordance with ASTM D-256; a tensile strength of from 2,000 psi to 10,000 psi (from 13.8 to 68.9 MPa), from 2,800 psi to 8,000 psi (from 19.3 to 55.1 MPa), or from 3,000 psi to 5,000 psi (from 20.7 to 34.5 MPa), as determined in accordance with ASTM D-638; a tensile modulus of from 100,000 psi to 500,000 psi (from 0.7 to 3.4 GPa), from 200,000 psi to 450,000 psi (from 1.4 to 3.1 GPa), or from 250,000 psi to 380,000 psi (from 1.7 to 2.6 GPa), as determined in accordance with ASTM D-638; an elongation of from 0.5% to 90%, from 5% to 70%, or from 35% to 60%, as determined in accordance with ASTM D-638; a flexural strength of from 3,000 psi to 15,000 psi (from 20.7 to 103.4 MPa), from 4,000 psi to 10,000 psi (from 27.6 to 68.9 MPa), or from 6,000 psi to 9,000 psi (from 41.4 to 62.1 MPa), as determined in accordance with ASTM D-790; a flexural modulus of from 200,000 psi to 500,000 psi (from 1.4 to 3.4 GPa), from 230,000 psi to 400,000 psi (from 1.6 to 2.8 GPa), or from 250,000 psi to 350,000 psi (from 1.7 to 2.4 GPa), as determined in accordance with ASTM D-790; an annealed heat distortion of from 180° F. to 215° F. (from 82° C. to 102° C.), from 185° F. to 210° F. (from 85° C. to 99° C.), or from 190° F. to 205° F. (from 88° C. to 96° C.), as determined in accordance with ASTM D-648; a Vicat softening of from 195° F. to 225° F. (from 91° C. to 107° C.), from 195° F. to 220° F. (from 91° C. to 104° C.), or from 200° F. to 215° F. (from 93° C. to 102° C.), as determined in accordance with ASTM D-1525; and/or a gloss 60° of from 30 to 100, from 40 to 98, or from 50 to 95, as determined in accordance with ASTM D-523.

In embodiments, the HIPS further comprises one or more additives to impart desired physical properties, such as, increased gloss or color. Examples of additives include without limitation stabilizers, talc, antioxidants, UV stabilizers, lubricants, plasticizers, ultraviolet screening agents, oxidants, antioxidants, anti-static agents, ultraviolet light absorbents, fire retardants, processing oils, mold release agents, coloring agents, pigments/dyes, fillers, and the like. The aforementioned additives may be used either singularly or in combination to form various formulations of the composition. For example, stabilizers or stabilization agents may be employed to help protect the polymeric composition from degradation due to exposure to excessive temperatures and/or ultraviolet light. The additives may be added after recovery of the HIPS, for example during compounding such as pelletization. These additives may be included in amounts effective to impart the desired properties. Effective additive amounts and processes for inclusion of these additives to polymeric compositions are known to one skilled in the art. For example, the additives may be present in an amount of from 0.1 wt. % to 50 wt. %, alternatively from 1 wt. % to 40 wt. %, alternatively from 2 wt. % to 30 wt. % based on the total weight of the composition.

Also disclosed herein is a system for carrying out the herein disclosed method, and producing a HIPS product having improved properties as described hereinabove. Such a HIPS production system comprises a devolatilizer downstream of a polymerization reactor, and from which a HIPS product is obtained, and apparatus for injecting an antioxidant as described hereinabove into the HIPS reaction system prior to the devolatilizer. The injection apparatus may be configured to inject the antioxidant into a polymerization feed, as described hereinabove, into a polymerization reactor, into a polymer melt downstream of a polymerization reactor and upstream of the devolatilizer, into the devolatilizer, or a combination thereof.

Features and Potential Advantages of the Herein-Disclosed HIPS Production System and Method As noted hereinabove, the herein-disclosed HIPS production system and method enable control of the swell index in a high impact polystyrene, via the utilization of a specific antioxidant as disclosed hereinabove. Desirably, the system and method enable production of a HIPS product having a desired degree of crosslinking. The system and method may also enable the production of a HIPS product having a desired degree of crosslinking, while still maintaining or even improving the color thereof relative to a HIPS product produced in the absence of the antioxidant.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1: Addition of Antioxidant Just Prior to Devolatilization (20 Minutes Before Targeted Conversion)

HIPS batch polymerization was run to test the effectiveness of antioxidants according to this disclosure to control crosslinking and preserve elastic properties of the rubber phase. The HIPS batch polymerization was run according to the formulation and conditions as listed in Table 1. To better simulate a plant production process, recycle (70% ethyl benzene and 30% styrene monomer) was collected and used in the reactions. The potential crosslinking retarders/antioxidants were pre-dissolved in about 2 mL of ethyl benzene and added either in the feed before the reaction, or 20 minutes before targeted conversion (targeted conversion of 70%). After the batch reaction was complete, the polymer was devolatilized (to remove residual monomers and other volatile compositions) for 60 minutes in a vacuum oven at 225° C. and pressures less than 10 torr. The devolatilized final polymer was then submitted for swell index measurements.

TABLE 1

Formulation and Run Conditions Utilized for HIPS Batch Reactions of Examples 1-3

| | |
|---|---|
| Batch Type | HIPS of polystyrene (PS) & polybutadiene (PB) |
| Stirrer Type | Single Blade |
| RPM | 115 |
| Initiator Type | LUPEROX ® PST-M75 (available from Arkema, Inc. in King of Prussia, PA) |
| Initiator Concentration (ppm) | 200 |
| Temperature Profile (° C.) | 110 (30 min), 130 (3 h), 150 (until >70% conversion) |
| Rubber Feed Concentration (wt %) | 5.57 |
| Rubber Concentration in Final Solids (wt %) | 8.54 |
| Rubber Type | BUNA ® CB 550 (available from Arlenxeo USA, LLC, in Pittsburgh, PA) |
| Mineral Oil in Feed (wt %) | 1.8 |
| Mineral Oil in Final Solids (wt %) | 2.75 |
| IRGANOX ® 1076 (ppm) | 0 |
| Zinc Stearate (ppm) | 1000 |
| Devolatilization Conditions | 225° C., 60 min. |

Rubber concentration in the final polymer depends on the eventual conversion after polymerization and devolatilization. Rubber crosslinking in HIPS was evaluated by swelling of the gel phase in toluene. The gel phase represents a mixture of PS-grafted PB, partially crosslinked PB and PS occluded within rubber particles, which is determined after removal of the PS matrix by solubilization. The swelling index is used here as an indirect measurement of the rubber crosslinking density, i.e., the higher the swelling, the lower the PB crosslinking.

The results of experiments performed utilizing 500 ppm antioxidant and 1000 ppm antioxidant (IRGANOX® 1520 available from BASF USA in Florham Park; also referred to in these Examples as AO1) relative to the feed by weight added twenty minutes prior to targeted conversion are provided in Table 2 hereinbelow.

TABLE 2

Results of Batch Experiments of Example 1 Characterization of HIPS Samples Produced via the Addition of Antioxidant 20 Minutes Prior to Targeted Conversion (70%)

|  | Baseline | 500 ppm AO1 | 1000 ppm AO1 |
|---|---|---|---|
| Mn (g/mol) | 105086 | 102553 | 101987 |
| Mw (g/mol) | 230577 | 217383 | 212541 |
| Mz (g/mol) | 381995 | 348004 | 340093 |
| Polydispersity | 2.2 | 2.1 | 2.1 |
| Swell Index (%) | 12.35 | 18.56 | 19.35 |
| RPS* (microns) | 5.54 | 5.46 | 5.92 |
| RPS Span | 1.79 | 1.56 | 1.67 |

*RPS—Rubber particle size obtained by laser diffraction

Compared to the baseline reaction without the use of antioxidant, both 500 ppm and 1000 ppm antioxidant relative to the feed by weight, showed increased swell indices (a gauge of crosslinking in rubber particles of HIPS). At lower concentrations (e.g., 500 ppm), AO1 increased swell index by 6-7 units. The molecular weights and molecular weight distribution do not seem affected, indicated by the polydispersity and Mw values. Weight average molecular weight (Mn), number average molecular weight (Mw), and Z-average molecular weight (Mz) were determined by Gel Permeation Chromatography (GPC). The Gel Permeation Chromatography results confirmed that the molecular weights of the polystyrene phase from the runs with antioxidant were consistent with the baseline reaction.

Example 2: Addition of Antioxidant to Polymerization Feed

Experiments demonstrated that AO1 was effective when added at a later stage of the polymerization. However, as noted hereinabove, it would be more advantageous and cost efficient if the scorch retarder can be added to the polymerization feed. HIPS batch reactions/experiments similar to Example 1 (utilizing the Formulation of Table 1) were run to test the effectiveness of adding antioxidant to the polymerization feed. The swell index was again determined, and utilized as an indirect measure of rubber crosslinking density. Table 3 presents the analytical results from reactions having AO1 added into the polymerization feed.

TABLE 3

Results of Batch Experiments of Example 2 Characterization of HIPS Samples Produced via the Addition of Antioxidant with Polymerization Feed

|  | Baseline | 100 ppm AO1 | 500 ppm AO1 |
|---|---|---|---|
| Mn (g/mol) | 105086 | 99477 | 93471 |
| Mw (g/mol) | 230577 | 216437 | 206245 |
| Mz (g/mol) | 381995 | 355401 | 339503 |
| Polydispersity | 2.2 | 2.2 | 2.2 |
| Swell Index (%) | 12.35 | 15.82 | 17.11 |
| RPS* (microns) | 5.54 | 6.25 | — |
| RPS Span | 1.79 | 2.015 | — |

*RPS—Rubber particle size obtained by laser diffraction

From the results of Table 3, it can be concluded that the additive efficiency remains constant whether the additive is added at the end or beginning of the polymerization. Again, the polydispersity and molecular weights don't appear to be affected by the addition time. Compared to the baseline control (without the use of retarding chemical agent), the HIPS samples produced with AO1 in the polymerization feed showed an obvious crosslinking retarding performance.

Example 3: Color and Recycle Contamination Results of HIPS Samples Prepared with AO1 and Zinc Stearate As noted hereinabove, the addition of zinc stearate, as a mold release additive, is known in the art to alter the color of the resulting HIPS, which can be undesirable for certain end-use application. Also as noted hereinabove, undesirable amounts (e.g., 10 to 15%) of certain agents added to improve ESCR (e.g., polyisobutylene (PIB)) can be undesirably lost in the devolatilization section. Experiments were performed to study the effect the addition of the herein-disclosed antioxidant scorch retarder additives during the polymerization of HIPS has on color, if any, and to determine the amount of recycle contamination, if any. Experiments were performed with the antioxidant being added either 20 minutes prior to targeted conversion (targeted conversion of 70%) or in the feed, as noted hereinbelow. Table 4 summarizes some of the results of these experiments.

TABLE 4

Results of Batch Experiments of Example 3 Color Results of HIPS Samples Produced via the Addition of Antioxidant

| Experiment | ZnSt (ppm) | Concentration (ppm) | Swell index (%) | $Y_{id}$ |
|---|---|---|---|---|
| Baseline Sample | 0 | — | 12.35 | −2.12 |
| Baseline Sample | 1000 | — | — | 5.79 |
| AO1 Added at the End | 1000 | 250 | 18.48 | 2.57 |
| AO1 Added in the Feed | 1000 | 500 | 17.11 | 4.56 |

* $Y_{id}$—Yellowness index obtained using a HunterLab color measurement equipment, available from Hunter Associates Laboratory in Reston, VA.

The results of the lab batch experiments tabulated in Table 4 showed low yellowness index values (Yid), and concomitantly indicated that the addition of zinc stearate increased the Yid in the samples, with or without the presence of the antioxidant. The addition of the antioxidant according to this disclosure decreased the Yid of the HIPS samples so produced relative to the Yid of HIPS samples produced in the absence of the antioxidant.

To investigate potential loss of AO1 into the devolatilization step due to vacuum, recycle from post-devolatilization was collected and analyzed. Gas chromatography analysis did not detect any trace of AO1 in the recycle, indicating that it stayed with the polymer sample.

Example 4: Lab Pilot Unit Studies

Figure 3:
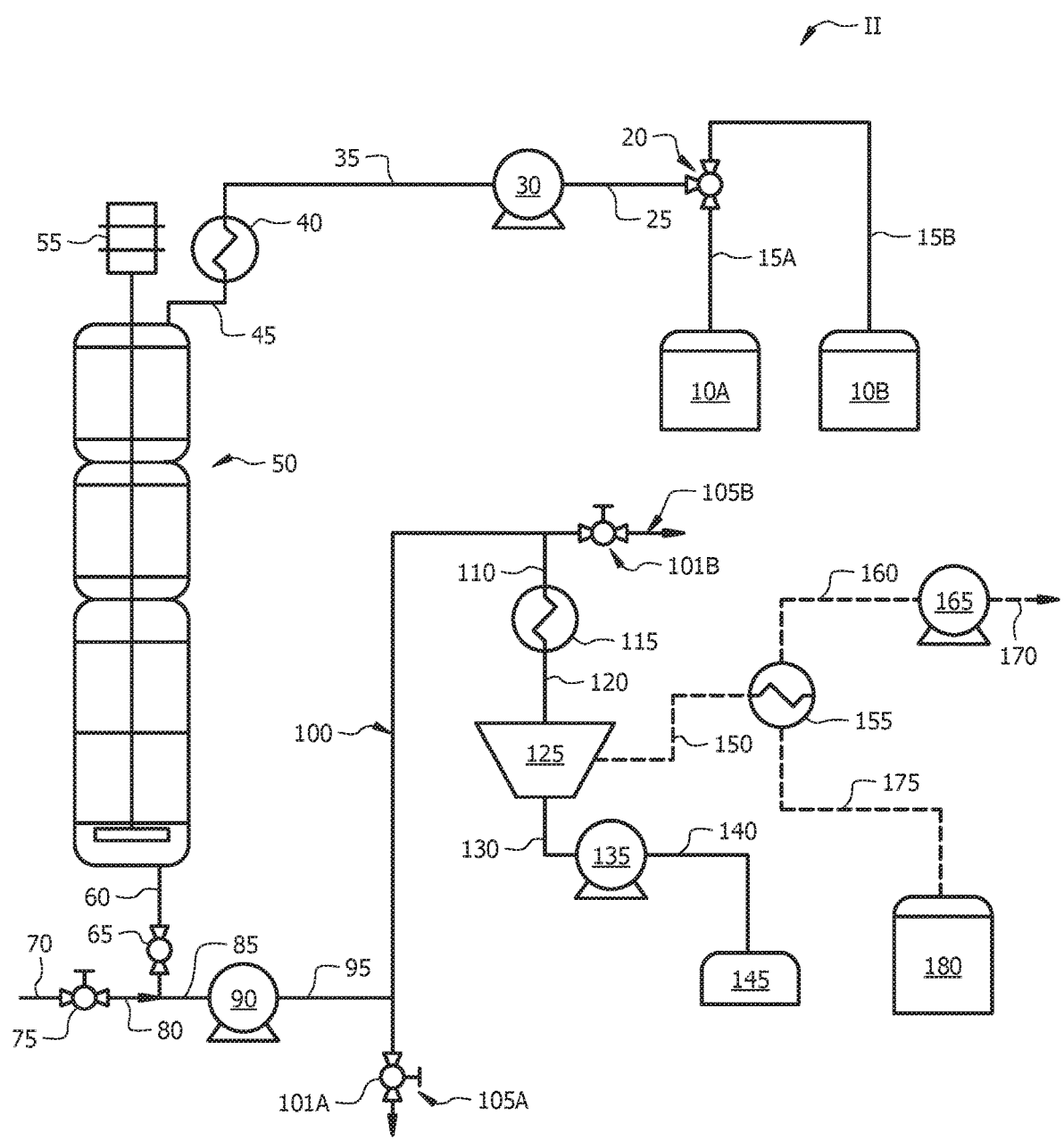
FIG. 3 is a schematic of a lab pilot plant utilized in the Examples herein.

To further confirm the results observed with samples prepared by batch reactions in the lab, lab pilot studies were carried out using a lab scale pilot unit. FIG. 3 is a schematic of the polystyrene (PS) lab scale pilot unit II. Pilot Unit II comprised feed cylinders 10A and 10B (feed comprising styrene monomer, rubber, ethyl benzene as solvent, radical initiator) fluidly joined via feed lines 15A and 15B and three-way valve 20 to provide feed line 25, which was pumped via pump 30 and line 35 into preheater 40. Preheater 40 operated to raise the temperature of the feed to the polymerization temperature. Heated feed was introduced via line 45 into polymerization reactor 50. The contents of polymerization reactor 50 were stirred via stirrer 55. The polymerization product was extracted from polymerization reactor 50 via polymerization reactor outlet line 60, flow therethrough controlled via valve 65, and pumped via pump 90, line 95, transfer line 100, line 110, preheater 115, and line 120 into devolatilizer 125. Injection point or line 70 was utilized for the addition of antioxidant, via valve 75, to the polymerization product in line 60, thus providing additive enhanced polymerization product in line 85. A valve 101A at Sampling Point 1 was utilized to draw a sample from transfer line 100, providing sample line 105A. A valve 101B at Sampling Point 2 was utilized to draw a sample from transfer line 100, providing sample line 105B. Vacuum pump 165 was utilized to maintain a vacuum on devolatilizer 125. Condenser 155 served to condense gas extracted from devolatilizer 125 via gas outlet line 150, and the condensate therefrom was sent to condensate recycle 180 via condensate line 175. Gas removed from condenser 155 was sent via gas line 160 and pump 165 to gas outlet line 170. Polystyrene product was extracted from devolatilizer 125 via devolatilizer product outlet line 130 and devolatilizer pump 135, and sent to PS storage bin 145 via PS product line 140.

In these experiments, HIPS reactions were completed using the PS lab pilot unit to determine the effectiveness of AO1 as a scorch retarder at polymerization conditions similar to a typical production site (process conditions of temperatures of 100-250° C. and pressures of 0.1-100 PSI (0.7-689.5 kPa)). During these experiments, 1000 ppm of AO1 was added at Injection Point 70 (see FIG. 3) after the polymerization reaction, and processed under conditions listed in Table 5 hereinbelow.

TABLE 5

Lab Pilot Results of Example 4

| | Finished in Lab Oven* Concentration AO1 (ppm) | | Samples Collected from Lab Pilot Concentration AO1 (ppm) | |
|---|---|---|---|---|
| | 0 | 1000 | 0 | 1000 |
| Swell Index (%) | 10.59 | 17.54 | 10.93 | 13.33 |
| Gel Content (%) | 27.15 | 15.91 | 24.42 | 20.43 |

*Samples were collected from transfer line (100 in FIG. 3) out of Sampling Point 2 (101B in FIG. 3), and finished in lab oven.

From the analytical results, it was observed that AO1 was effective to reduce the crosslinking rate of the rubber phase in the lab pilot (in a continuous process) studies, as the final swell index values of the HIPS samples increased from 10.9% to 13.3%

Example 5: Plant Trials

Several trials were completed at a plant to determine if the increase on swell index of the rubber phase was replicatable at a plant scale. Results from the plant trials showed AO1 to increase swell index values up to about 15% at the higher AO1 concentration (400 ppm) tested. As noted herein, as swell index is an indication of the elastic characteristics of the rubber phase, higher swell index values should correlate with improved impact properties. Izod impact strength, as measured by ASTM D256, was measured, and the swell index and Izod performance of the HIPS samples examined in these plant trials are tabulated in Table 6.

TABLE 6

Swell index and Izod Results of Plant Trials of Example 5

| AO1 (ppm) | Swell Index (%) | Izod (ft-lb/in (J/m)) |
|---|---|---|
| 0 | 9.9 | 2.0 (106.7) |
| 100 | 10.7 | 2.1 (112.0) |
| 200 | 10.8 | 2.0 (106.7) |
| 300 | 11.4 | 2.2 (117.4) |
| 400 | 11.5 | 2.3 (122.7) |

To further study the impact of the addition into a polymerization process of AO1 as scorch retarder on the color of the final material, yellowness index values (Yid) and the yellow-blue color values (b) were determined, via a Hunter Lab calorimeter, for several HIPS samples studied in these plant trials.

TABLE 7

Color Results of Plant Trials of Example 5

| AO1 (ppm) | Yid | b |
|---|---|---|
| 0 | −2.7 | −0.8 |
| 100 | −2.3 | −0.6 |
| 200 | −1.9 | −0.4 |
| 300 | −2.9 | −0.9 |
| 400 | −1.3 | 0.1 |

As seen in the data in Table 7, yellowness index values (Yid) tended to increase when AO1 was used during the plant trials, although the Yid values remained at manageable levels.

While various embodiments have been shown and described, modifications thereof can be made by one skilled in the art without departing from the spirit and teachings of the disclosure. The embodiments described herein are exemplary only, and are not intended to be limiting. Many variations and modifications of the subject matter disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$ and an upper limit, $R_U$ is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

ADDITIONAL DESCRIPTION

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, and/or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

Embodiments disclosed herein include:

A: A method comprising: operating a high impact polystyrene (HIPS) reaction system, wherein the HIPS reaction system comprises a devolatilizer downstream of a polymerization reactor, and from which a HIPS product is obtained; and injecting an antioxidant into the HIPS reaction system prior to the devolatilizer, wherein the antioxidant comprises one or more aromatic antioxidants.

B: A method comprising: operating a high impact polystyrene (HIPS) reaction system, wherein the HIPS reaction system comprises a devolatilizer downstream of a polymerization reactor; and injecting an antioxidant into the HIPS reaction system prior to the devolatilizer, wherein the antioxidant is present in a polymer melt and/or a polymerization feed prior to the devolatilizer at a concentration in the range of from about 1 ppm to about 10000 ppm, from about 50 ppm to about 10000 ppm, from about 50 ppm to about 1000 ppm, from about 100 ppm to about 1000 ppm, or from about 300 ppm to about 1000 ppm by weight.

C: A high impact polystyrene (HIPS) product produced by: operating a HIPS reaction system to produce the HIPS product, wherein the HIPS reaction system comprises a devolatilizer downstream of a polymerization reactor, wherein operating the HIPS reaction system to produce the HIPS product comprises injecting an antioxidant into the HIPS reaction system prior to the devolatilizer, and wherein the antioxidant comprises one or more aromatic antioxidants.

Each of embodiments A, B and C may have one or more of the following additional elements: Element 1: wherein the antioxidant comprises at least one thiol group, at least one cresol group, or a combination thereof. Element 2: wherein the antioxidant comprises at least two thiol groups. Element 3: wherein the antioxidant comprises at least one alkyl-thiomethyl group. Element 4: wherein the alkyl-thiomethyl group comprises octylthiomethyl groups, dodecylthiomethyl groups, or combinations thereof. Element 5: wherein the antioxidant comprises at least two alkyl-thiomethyl groups. Element 6: wherein the antioxidant comprises 2-methyl-4, 6-bis(octylthiomethyl)phenol, 2-methyl-4,6-bis (dodecylthiomethyl) phenol, or a combination thereof. Element 7: wherein the antioxidant has a solubility in ethylbenzene that is greater than or equal to about 30% (w/w), 40% (w/w), or 50% (w/w). Element 8: wherein the antioxidant has a low volatility, as evidenced by a vapor pressure at 25° C. that is less than or equal to about $4E^{-5}$ Pa, $3E^{-5}$ Pa, or $2E^{-5}$ Pa. Element 9: wherein injecting the antioxidant into the HIPS reaction system prior to the devolatilizer further comprises injecting the antioxidant into the polymerization reactor, injecting the antioxidant into a polymer melt downstream of the polymerization reactor, or both. Element 10: comprising injecting the antioxidant into the polymerization reactor, wherein injecting the antioxidant into the polymerization reactor further comprises injecting the antioxidant into a feed to the polymerization reactor. Element 11: comprising injecting the antioxidant into a polymer melt downstream of the polymerization reactor, wherein injecting the antioxidant into a polymer melt downstream of the polymerization reactor further comprises injecting the antioxidant into a polymer melt feed just prior to introduction of the polymer melt feed into the devolatilizer. Element 12: further comprising and/or wherein devolatilization comprises devolatilizing for a time period in the range of from about 30 to about 60, alternatively from about 40 to about 60, or alternatively from about 50 to about 60 minutes at a temperature in the range of about 200° C. to 225° C., alternatively from about 215° C. to about 225° C. or alternatively from about 220° C. to about 225° C. Element 13: wherein the concentration of the antioxidant prior to the devolatilizer is in the range of from about 1 ppm and 1% (by weight). Element 14: wherein the antioxidant concentration in the polymer melt prior to the devolatilizer is in the range of from about 50 ppm to about 1000 ppm, from about 100 ppm to about 1000 ppm, or from about 300 ppm to about 1000 ppm by weight. Element 15: wherein the HIPS product has a swell index, after devolatilization, that is at least from about 1% to about 50%, from 1% to about 40%, from 1% to about 30%, from 5% to about 50%, or from 10% to about 50% greater than the swell index of a HIPS product produced in substantially the same manner absent the antioxidant. Element 16, wherein devolatilization comprises devolatilizing for a time period in the range of from about 30 to about 60, alternatively from about 40 to about 60, or alternatively from about 50 to about 60 minutes at a temperature in the range of about 200° C. to 225° C., alternatively from about 215° C. to about 225° C. or alternatively from about 220° C. to about 225° C. Element 17: wherein the swell index of the HIPS product is at least about 1 to 10, 2 to 10, 3 to 10, 4 to 10, or 5 to 10 over that of a HIPS product produced in substantially the same manner absent the antioxidant. Element 18: wherein the HIPS product has at least as low a discoloration, after devolatilization, as a HIPS product produced in substantially the same manner absent the antioxidant. Element 19: wherein at least as low a discoloration is indicated by a yellow index ($Y_{id}$) value that is less than or equal to that of the HIPS product produced in substantially the same manner absent the antioxidant. Element 20: wherein the cresol group is selected from o-cresol groups. Element 21: wherein the antioxidant is injected 30, 25, 20, 15, or 10 minutes prior to targeted conversion. Element 22: wherein the targeted conversion is greater than or equal to about 40, 50, 60, or 70% (conversion defined here as total mass of polymer divided by total mass of styrene monomer fed).

While preferred embodiments of the invention have been shown and described, modifications thereof can be made by one skilled in the art without departing from the teachings of this disclosure. The embodiments described herein are exemplary only, and are not intended to be limiting. Many variations and modifications of the invention disclosed herein are possible and are within the scope of the invention.

Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A method comprising:
   operating a high impact polystyrene (HIPS) reaction system, wherein the HIPS reaction system comprises a devolatilizer downstream of a polymerization reactor, and from which a HIPS product is obtained; and
   injecting an antioxidant into the HIPS reaction system prior to the devolatilizer to control free radical crosslinking, wherein the antioxidant is aromatic and comprises at least one alkyl-thiomethyl group.

2. The method of claim 1, wherein the antioxidant comprises at least one cresol group, at least two alkyl-thiomethyl groups, or a combination thereof.

3. The method of claim 1, wherein the at least one alkyl-thiomethyl group comprises octylthiomethyl groups, dodecylthiomethyl groups, or combinations thereof.

4. The method of claim 1, wherein the antioxidant comprises 2-methyl-4,6-bis(octylthiomethyl)phenol, 2-methyl-4,6-bis (dodecylthiomethyl) phenol, or combinations thereof.

5. The method of claim 1, wherein the antioxidant has a solubility in ethylbenzene that is greater than or equal to about 30% (w/w).

6. The method of claim 1, wherein injecting the antioxidant into the HIPS reaction system prior to the devolatilizer further comprises injecting the antioxidant into the polymerization reactor, injecting the antioxidant into a polymer melt downstream of the polymerization reactor, or both.

7. The method of claim 1 further comprising devolatilizing for a time period in the range of from about 30 to about 60 minutes at a temperature in the range of about 200° C. to 225° C.

8. The method of claim 1, wherein the concentration of the antioxidant prior to the devolatilizer is in the range of from about 1 ppm and 1% (by weight).

9. The method of claim 1, wherein the swell index of the HIPS product is at least about 1 to 10 over that of a HIPS product produced in substantially the same manner absent the antioxidant.

10. The method of claim 1, wherein the HIPS product has at least as low a discoloration, after devolatilization, as a HIPS product produced in substantially the same manner absent the antioxidant.

11. A method comprising:
    operating a high impact polystyrene (HIPS) reaction system, wherein the HIPS reaction system comprises a devolatilizer downstream of a polymerization reactor; and
    injecting an antioxidant into the HIPS reaction system prior to the devolatilizer to control free radical crosslinking, wherein the antioxidant is aromatic and comprises at least one alkyl-thiomethyl group, and wherein the antioxidant is present in a polymer melt and/or a polymerization feed prior to the devolatilizer at a concentration in the range of from about 1 ppm to about 10000 ppm by weight.

12. The method of claim 11, wherein the antioxidant comprises at least one cresol group, at least two alkyl-thiomethyl groups, or a combination thereof.

13. The method of claim 11, wherein the at least one alkyl-thiomethyl group comprises octylthiomethyl groups, dodecylthiomethyl groups, or combinations thereof.

14. The method of claim 11, wherein the antioxidant comprises 2-methyl-4,6-bis(octylthiomethyl)phenol, 2-methyl-4,6-bis (dodecylthiomethyl) phenol, or a combination thereof.

15. The method of claim 11, wherein the antioxidant has a solubility in ethylbenzene that is greater than or equal to about 30% (w/w).

16. The method of claim 11, wherein injecting the antioxidant into the HIPS reaction system prior to the devolatilizer further comprises injecting the antioxidant into the polymerization reactor, injecting the antioxidant into a polymer melt downstream of the polymerization reactor, or both.

17. The method of claim 11 further comprising devolatilizing for a time period in the range of from about 30 to about 60 minutes at a temperature in the range of about 200° C. to 225° C.

18. The method of claim 11, wherein the swell index of the HIPS product is at least about 1 to 10 over that of a HIPS product produced in substantially the same manner absent the antioxidant.

19. The method of claim 11, wherein the HIPS product has at least as low a discoloration, after devolatilization, as a HIPS product produced in substantially the same manner absent the antioxidant.

20. The method of claim 1, wherein the HIPS reaction system into which the antioxidant is injected comprises zinc stearate.

21. The method of claim 11, wherein the HIPS reaction system into which the antioxidant is injected comprises zinc stearate.

* * * * *